(12) United States Patent
K et al.

(10) Patent No.: US 12,135,634 B2
(45) Date of Patent: Nov. 5, 2024

(54) DYNAMIC TRACING OF VARIABLES AT RUNTIME

(71) Applicant: SAP SE, Walldorf (DE)

(72) Inventors: Umesh K, Bangalore (IN); Jovin Jijo, Thrissur (IN)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 18/114,631

(22) Filed: Feb. 27, 2023

(65) Prior Publication Data
US 2024/0289256 A1  Aug. 29, 2024

(51) Int. Cl.
*G06F 11/36* (2006.01)

(52) U.S. Cl.
CPC .................................. *G06F 11/364* (2013.01)

(58) Field of Classification Search
CPC .................................................... G06F 11/364
See application file for complete search history.

(56) References Cited

U.S. PATENT DOCUMENTS

| | | | |
|---|---|---|---|
| 8,584,097 B2* | 11/2013 | Lindahl | G06F 11/3636 717/134 |
| 9,658,942 B2* | 5/2017 | Bhat | H04L 12/4641 |
| 10,360,087 B2* | 7/2019 | Suter | G06F 9/546 |
| 10,915,422 B2* | 2/2021 | Bouissou | G06F 8/43 |
| 11,487,561 B1* | 11/2022 | Wilmot | G06F 11/3636 |
| 2003/0145309 A1* | 7/2003 | Inamdar | G06F 11/364 717/130 |
| 2009/0164981 A1* | 6/2009 | Heidasch | G06F 11/36 717/129 |
| 2011/0154300 A1* | 6/2011 | Rao | G06F 11/3624 717/133 |

(Continued)

FOREIGN PATENT DOCUMENTS

| | | | | |
|---|---|---|---|---|
| CN | 101995860 A | * | 3/2011 | ......... G05B 19/0426 |
| CN | 102289404 A | * | 12/2011 | ............ G06F 11/362 |

OTHER PUBLICATIONS

Medvidovic et al., "A Classification and Comparison Framework for Software Architecture Description Languages", Jan. 2000, IEEE, vol. 26, No. 1 (Year: 2000).*

(Continued)

*Primary Examiner* — Wei Y Zhen
*Assistant Examiner* — Junchun Wu
(74) *Attorney, Agent, or Firm* — SCHWEGMAN LUNDBERG & WOESSNER, P.A.

(57) ABSTRACT

A computer system may receive a user input associated with a source code file via a first user interface displayed a first computing device, where the source code file comprising source code of a software application. The computer system may then obtain a tracing configuration based on the user input, where the tracing configuration comprises a line number of the source code and a variable within the source code. Next, the computer system may set a breakpoint in the source code at the line number using the tracing configuration, and then trace the variable during execution of the source code, where the tracing comprises determining a value of the variable using the breakpoint in the source code and creating a call stack based on the execution of the source code. The computer system may then store the value of the variable and the call stack in a log.

17 Claims, 9 Drawing Sheets

(56) References Cited

U.S. PATENT DOCUMENTS

| | | | | |
|---|---|---|---|---|
| 2012/0117542 | A1* | 5/2012 | Bates | G06F 8/71 |
| | | | | 717/125 |
| 2016/0321162 | A1* | 11/2016 | Bates | G06F 11/3624 |
| 2018/0181480 | A1* | 6/2018 | Dracea | G06F 11/3624 |
| 2019/0213355 | A1* | 7/2019 | Raviv | G06F 16/901 |
| 2021/0286702 | A1* | 9/2021 | Grover | G06F 11/364 |
| 2021/0303440 | A1* | 9/2021 | Rodgers | G06F 11/3065 |
| 2021/0342785 | A1* | 11/2021 | Mann | G06F 40/186 |
| 2021/0357310 | A1* | 11/2021 | Blouvshtein | G06F 11/302 |
| 2023/0140208 | A1* | 5/2023 | K | G06F 11/3624 |
| | | | | 717/124 |
| 2024/0184989 | A1* | 6/2024 | Mann | G06F 40/166 |

OTHER PUBLICATIONS

White et al., "Automated Reasoning for Multi-step Feature Model Configuration Problems", Aug. 2012, Journal of Systems and Software (Year: 2012).*

Corbett et al., "Bandera : Extracting Finite-state Models from Java Source Code", Jun. 2000, ACM (Year: 2000).*

Johnson et al., "Documenting Frameworks using Patterns", 1992, ACM (Year: 1992).*

Martin et al., "Finding Application Errors and Security Flaws Using PQL: a Program Query Language", 2005, ACM (Year: 2005).*

Spooner et al., "Performance feature identification by comparative trace analysis", 2004, Elsevier B.V. (Year: 2004).*

Suh et al., "Secure Program Execution via Dynamic Information Flow Tracking", 2004, ACM (Year: 2004).*

\* cited by examiner

FIG. 3

DEBUG LOG: F3E4168563BDRBWI

UUID: F3E4168563BDR  START TIME: 2020-12-08T09:22:42.843Z
CONFIGURATION UUID: 875F6BD823  END TIME: 2020-12-08T09:23:48.025Z

LOG

| TIME | SOURCE FILE | BREAKPOINT LINE | EVALUATED VARIABLE | VALUE | LOGON NAME | TENANT ID | SESSION ID |
|---|---|---|---|---|---|---|---|
| 2020-12-08T09:23:... | NODE_MODULE... | 303 | ROLEID | ADMIN | USER_3 | BAFDEV | 5A02D9 |

CALL STACK

| LEVEL | FILE | FUNCTION | LINE | PATH |
|---|---|---|---|---|
| 1 | ACTION.TS | RETRIEVEBYASSOC | 305 | C:\PROJECTEXECUTION\SOURCE\DEBUG2\NODE... |
| 2 | ACTION.TS | RETRIEVEBYASSOC | 311 | C:\PROJECTEXECUTION\SOURCE\DEBUG2\NODE... |
| 3 | ACTION.TS | RETRIEVEBYASSOC | 308 | C:\PROJECTEXECUTION\SOURCE\DEBUG2\NODE... |
| 4 | ACTION.TS | RETRIEVEBYASSOC | 309 | C:\PROJECTEXECUTION\SOURCE\DEBUG2\NODE... |
| 5 | ACTION.TS | RETRIEVEBYASSOCI | 383 | C:\PROJECTEXECUTION\SOURCE\DEBUG2\NODE... |

FIG. 6

DYNAMIC TRACING OF VARIABLES AT RUNTIME

BACKGROUND

Tracing involves a specialized use of logging to record information about a program's execution. Logging is the act of keeping a log of events that occur in a computer system, such as problems, errors, or other information on current operations of a program. These events may occur in the operating system or in other software. The logged information may be used by programmers for debugging purposes, as well as by experienced system administrators, technical-support personnel, or software monitoring tools to diagnose common problems with software.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 3 illustrates an example user interface in which source code of a source code file is displayed.

FIG. 6 illustrates an example user interface in which a value of a variable and a call stack are displayed.

DETAILED DESCRIPTION

Figure 1:
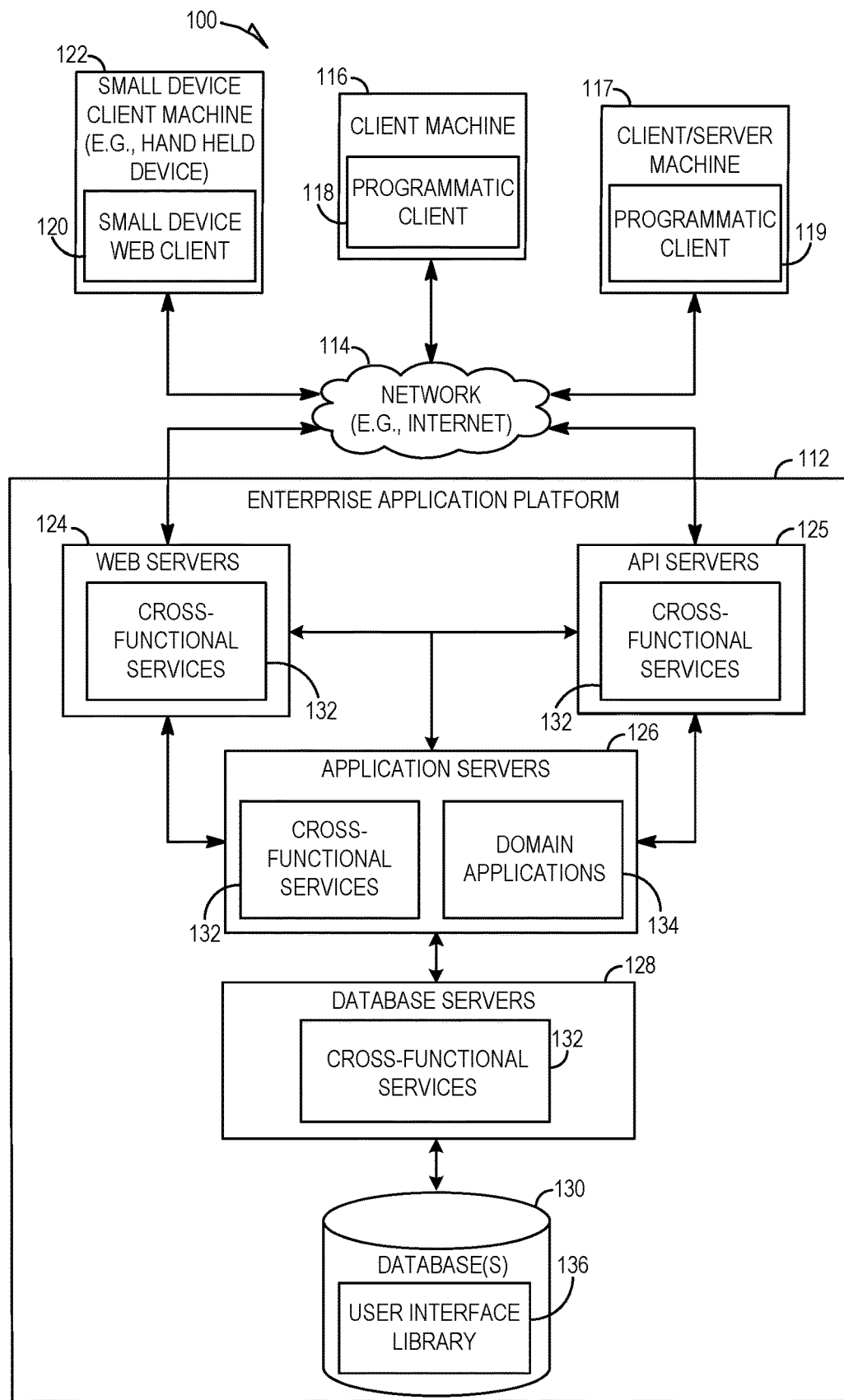
FIG. 1 is an example network diagram illustrating a system.

Example methods and systems of dynamically tracing variables are disclosed. In the following description, for purposes of explanation, numerous specific details are set forth in order to provide a thorough understanding of example embodiments. It will be evident, however, to one skilled in the art that the present embodiments can be practiced without these specific details.

A support engineer who needs to investigate a customer-reported problem in a multi-tenant cloud application built on a cross-platform server environment may desire to investigate the reported problem in real-time by accessing the tenant of the customer. However, options to investigate the issue by simulating the customer-reported steps or by standard technical logs may not be sufficient to effectively investigate the problem, as these options fail to provide access and insights into certain aspects of the running application, such as the program flow and values of global and stack variables. For example, some users may not have access to a full debug environment or only a subset of operations may be allowed for certain users. Furthermore, in some cases, pausing the software application to investigate aspects of the technical problem may not be feasible. As a result of these technical challenges, the ability to effectively address technical problems in a multi-tenant cloud application is limited. Other technical challenges may arise as well.

The implementation of the features disclosed herein involves a non-generic, unconventional, and non-routine operation or combination of operations. By applying one or more of the solutions disclosed herein, some technical effects of the system and method of the present disclosure are to enable a user to control a dynamic tracing of variables. In some example embodiments, a computer system may receive a user input associated with a source code file via a first user interface of a first computing device, where the source code file comprising source code of a software application. The computer system may then obtain a tracing configuration based on the user input, where the tracing configuration comprises a line number of the source code and a variable within the source code. Next, the computer system may set a breakpoint in the source code at the line number using the tracing configuration, and then trace the variable during execution of the source code, where the tracing comprises determining a value of the variable using the breakpoint in the source code and creating a call stack based on the execution of the source code. The computer system may then store the value of the variable and the call stack in a log.

By providing a user interface through which a user may provide input for a tracing configuration that is used by the computer system to automatically set a breakpoint in the source code and trace the variable during execution of the source code, the computer system enables the user to capture the value of variables and the call stack during runtime. As a result, the user may effectively analyze a technical problem with the software application without having to manually debug the software application. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
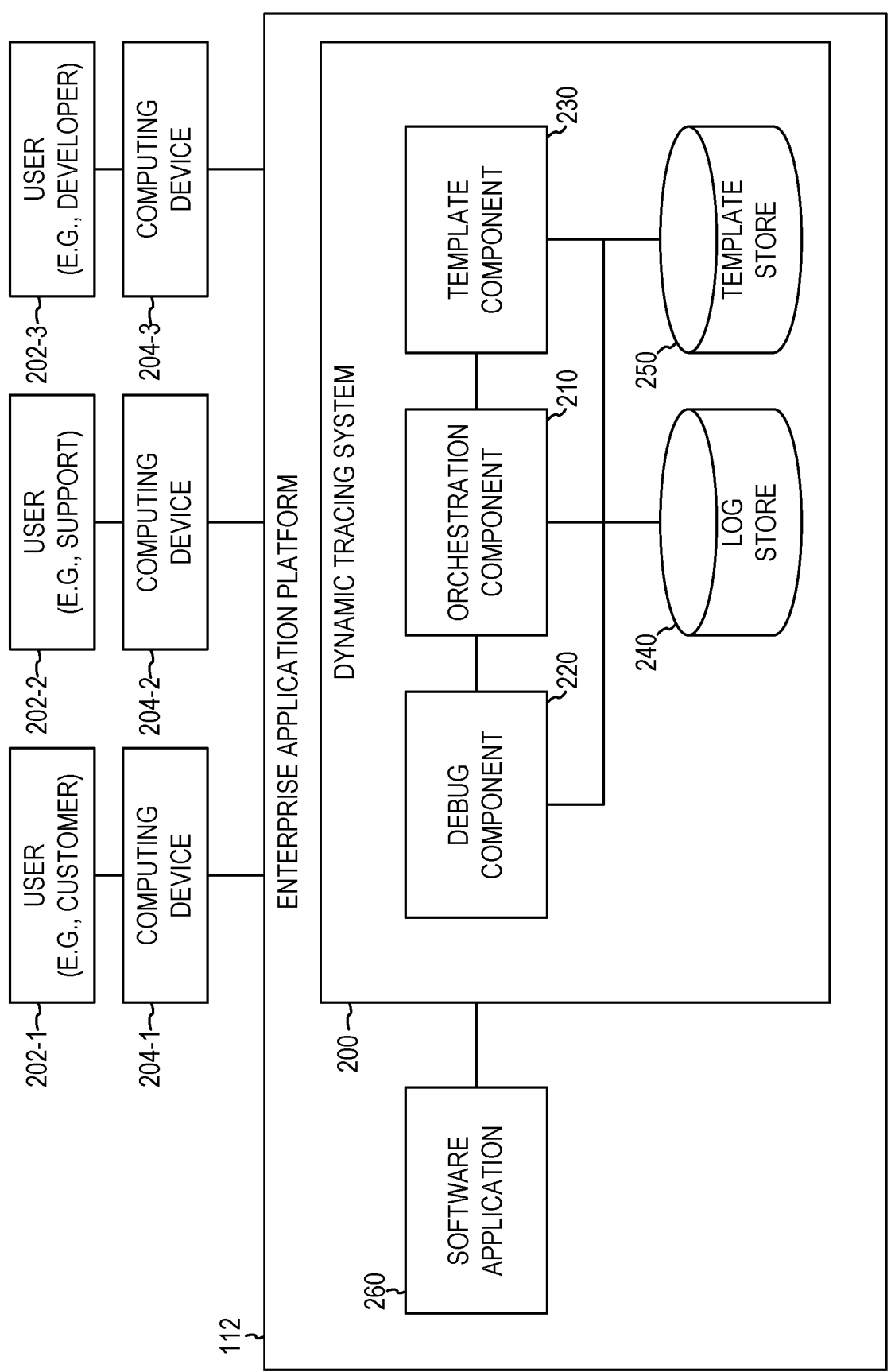
FIG. 2 is a block diagram illustrating an example dynamic tracing system.

FIG. 2 is a block diagram illustrating an example dynamic tracing system 200. The components shown in FIG. 2 may be configured to communicate with each other via one or more network connections, such as via the network 114 in FIG. 1. In some example embodiments, the dynamic loading system 200 comprises any combination of one or more of an orchestration component 210, a debug component 220, a template component 230, a log store 240, and a template store 250. One or more of the components of the dynamic tracing system 200 may be implemented by the enterprise application platform 112 of FIG. 1. For example, the orchestration component 210, the debug component 220, and the template component 230 may be incorporated into the application server(s) 126, while the log store 240 and the template store 250 may be incorporated into the database(s) 130. However, the dynamic tracing system 200 may be implemented in other ways as well.

One or more users 202 may use a corresponding computing device 204 to access and interact with the dynamic tracing system 200. One user 202-1 may be a customer who uses a software application 260 via a computing device 204-1. In some example embodiments, the software application 260 may comprise a multi-tenant application. A multi-tenancy architecture is a software architecture in which a single instance of software runs on a server and serves multiple tenants. Systems designed in such manner are often referred to as being shared, rather than dedicated or isolated. A tenant is a group of users who share a common access with specific privileges to a software instance. With a multi-tenancy architecture, the software application 260 is designed to provide every tenant a dedicated share of the instance, including its data. The software application 260 may reside on and be implemented by the enterprise application platform 112. In some example embodiments, the software application 260 may comprise an enterprise resource planning (ERP) application that is configured to help the user 202-1 run their business, supporting automation and processes in finance, human resources, manufacturing, supply chain, services, and procurement. Other configurations of the software application are also within the scope of the present disclosure.

Another user 202-2 may be a support engineer who uses a computing device 204-2 to access the features and functions of the dynamic tracing system 200. The user 202-2 may help the user 202-1 address and resolve technical problems with the software application 260. Yet another user 202-3 may be a software developer who uses a computing device 204-3 to create the software application 260 and manage the deployment of the software application 260, such as on the enterprise application platform 112.

The dynamic tracing system 200 may be configured to automate the process of debugging the software application 260 by automatically setting breakpoints in source code of the software application 260, executing the source code of the software application, capturing variable values by evaluating expressions during execution of the source code, as well as capturing a call stack for the execution of the source code, and logging the captured variable values and call stack for use by one or more users 202, such as by a support engineer to help investigate and resolve a technical problem with the software application 260.

In some example embodiments, orchestration component 210 may be configured to receive a user input associated with a source code file via a first user interface displayed on a first computing device 204. The source code file may comprise source code of the software application 260. The orchestration component 210 may also be configured to obtain a tracing configuration based on the user input. The tracing configuration may comprise a line number of the source code and a variable within the source code. The variable may comprise a global variable, which is a variable that it is visible and accessible throughout the software application, or a stack variable, which is a variable that is stored in a stack. Other variables are also within the scope of the present disclosure. The user input itself may comprise the tracing configuration, such that the orchestration component 210 may extract the tracing configuration directly from the user input.

Figure 3:
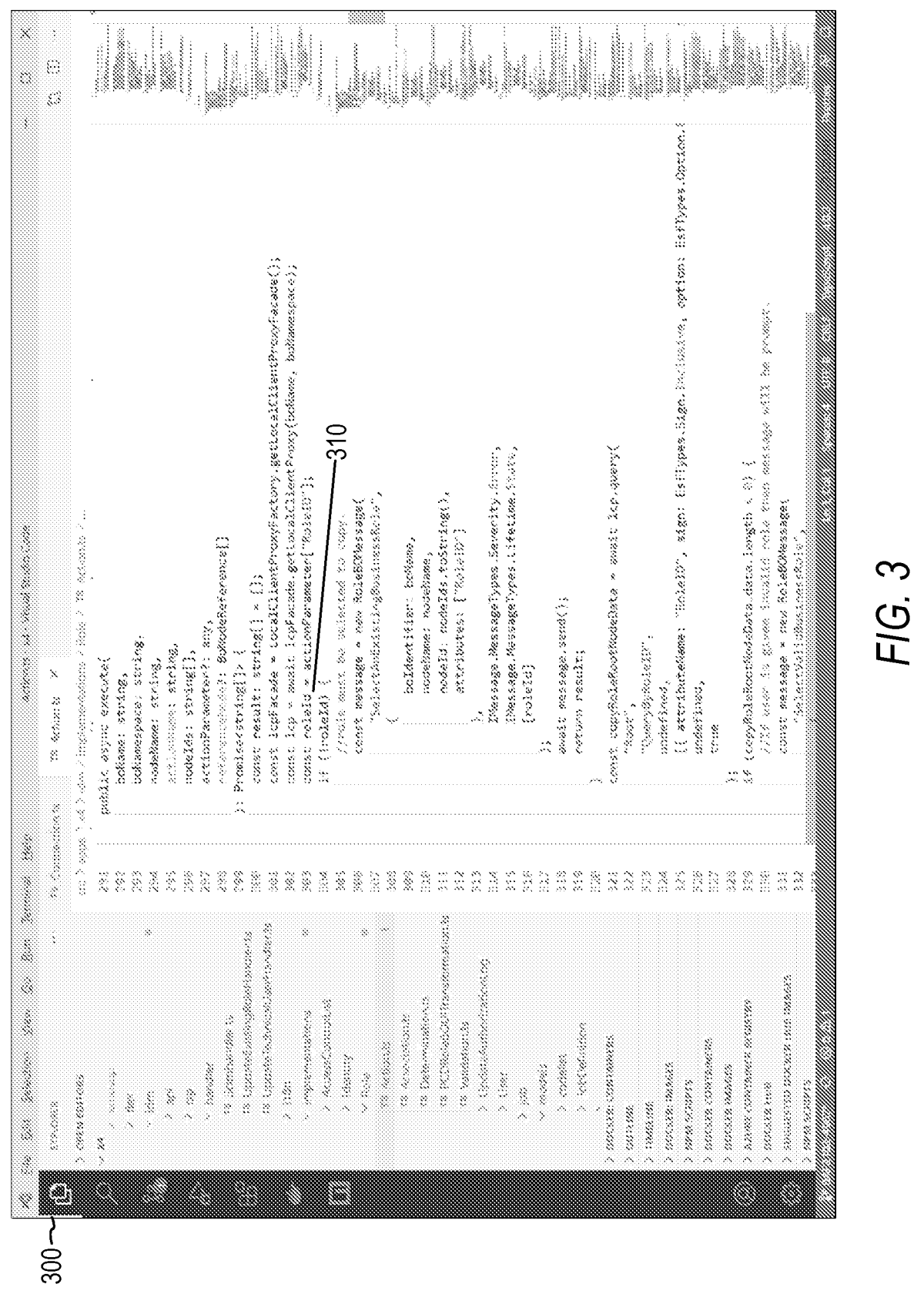

FIG. 3 illustrates an example user interface 300 in which source code of a source code file is displayed. The user 202 may use a source code editor to view the source code. As seen in FIG. 3, the source code may include a variable 310 that the user would like to trace during runtime. The user may use the visualization of the source code in the user interface 300 to identify the variable 310 and the line number of an expression in which the variable resides, and then use the variable 310 and the line number for the tracing configuration, such as by entering the variable 310 and the line number as user input for use in the tracing configuration.

Figure 4:
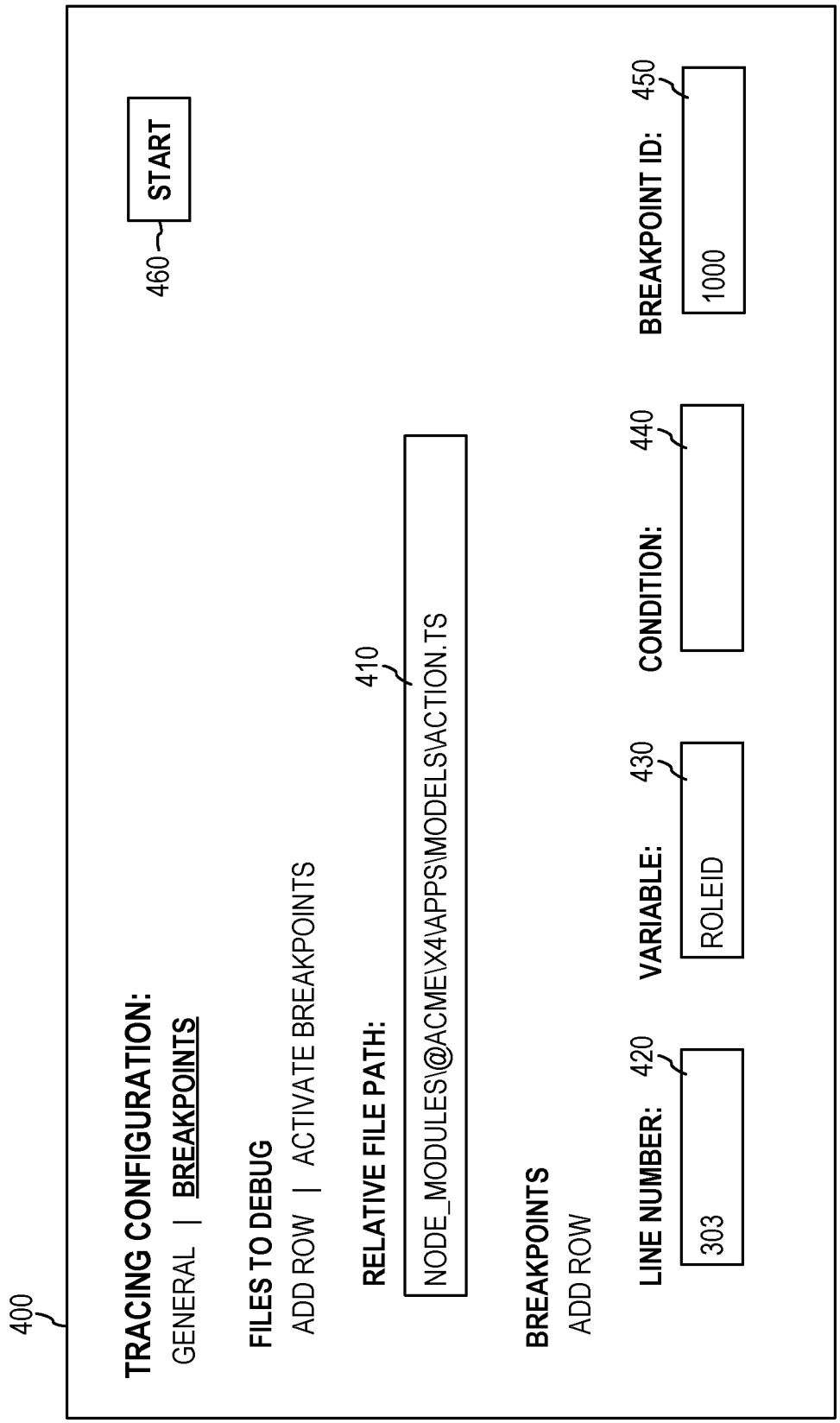
FIG. 4 illustrates an example user interface in which user input for a tracing configuration is entered.

FIG. 4 illustrates an example user interface 400 in which user input for a tracing configuration is entered. The user interface 400 may comprise user interface elements configured to enable the user to enter user input. For example, the user interface 400 may comprise text fields 410, 420, 430, 440, and 450. The text field 410 may be configured to receive a file path for the source code file. The text field 420 may be configured to receive the line number of the expression in which the variable 310 resides. The text field 430 may be configured to receive the variable 310. The text field 440 may be configured to receive a condition for a breakpoint. The text field 450 may be configured to receive an identification for the breakpoint. Other configurations of text field or other types of user interface elements for receiving the user input are also within the scope of the present disclosure. The user interface 400 may also comprise a selectable user interface element 460 that is configured to submit the entered user input to the orchestration component 210 in response to its selection.

The tracing configuration may be obtained in other ways as well. For example, the orchestration component 210 may be configured to retrieve the tracing configuration from a template stored in the template store 250. The template component 230 may be configured to enable the user 202-3, such as a software developer, to define a template that comprises the tracing configuration. For example, the template component 230 may display a user interface on the computing device 204-3 of the user 202-3, and the user interface may be configured to enable the user 202-3 to submit details of the template, including the details of the tracing configuration. For example, the user 202-3 may enter an identification of the source code file, a line number indicating a location of where to inspect in the source code, a variable 310 to be included for inspection, and an identification of a user interface or an API to which to map the template. The user may also enter a description of the template. The description may indicate that use of the template comprises the tracing of the specified variable 310. The template component 230 may then use the information entered by the user 202-3 to create the template, which includes the line number and variable 310 of the tracing configuration. The template component 230 may store the template in the template store 250. The template store 250 may comprise a data store that is configured to store templates.

Once the template is stored in the template store 250, user 202-1 or user 202-2 may select the template based on the specific user interface or API they are consuming via their computing device 204, enabling the usage of the tracing configuration of the template to get the desired diagnostics from the execution of the source code of the software application 260. The template component 230 may also be configured to enable the user 202 to customize the template, as well as to add new templates on the fly.

Figure 5:
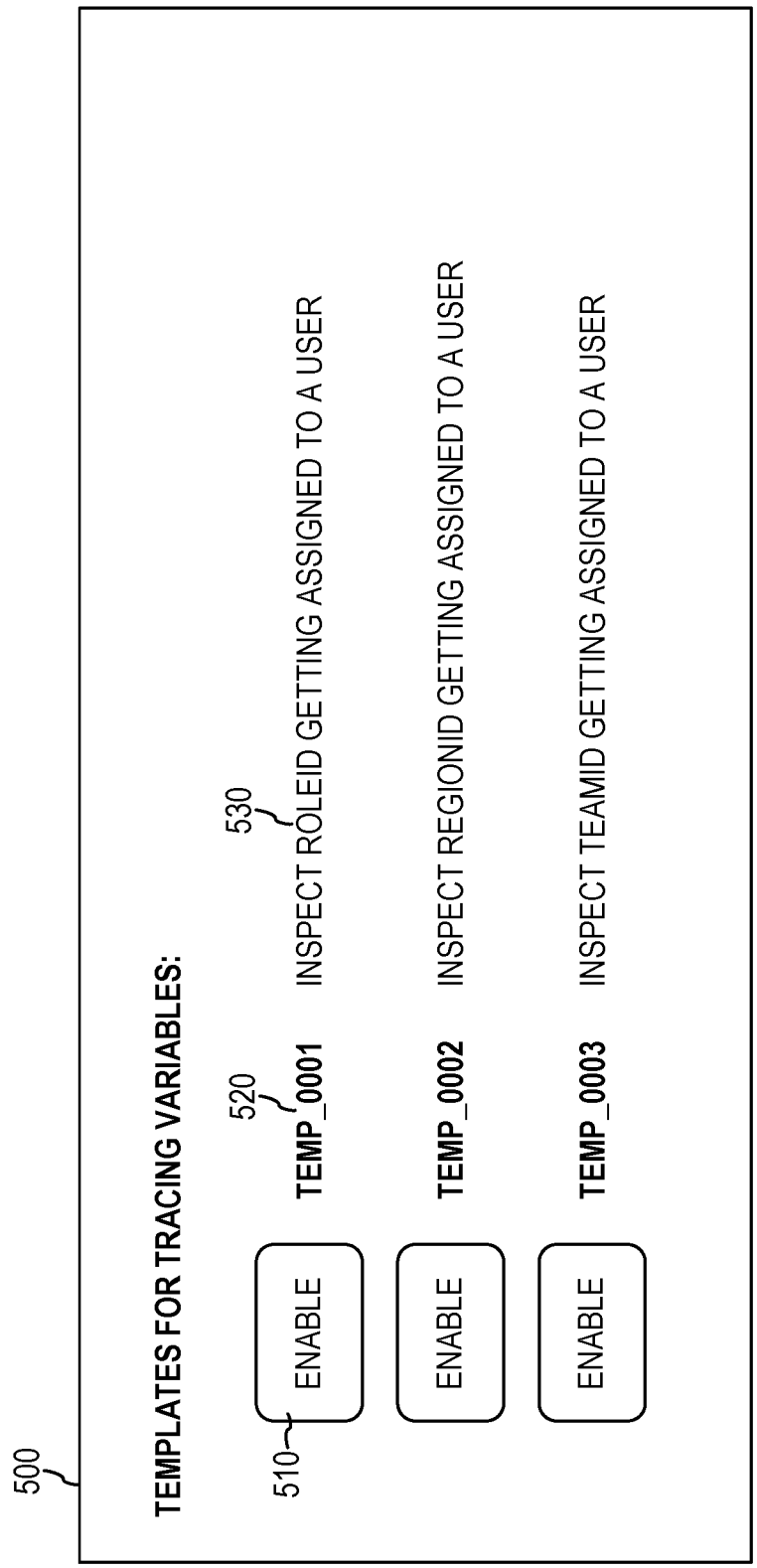
FIG. 5 illustrates an example user interface in which a user may select a template for a tracing configuration to use in dynamically tracing a variable.

FIG. 5 illustrates an example user interface 500 in which a user may select a template for a tracing configuration to use in dynamically tracing a variable. In FIG. 5, the user interface 500 displays a selectable user interface element 510 in association with an identification 520 of a template and a description of the template. The orchestration component 210 may display the user interface 500 on the computing device 204 of the user 202, and then receive a user selection of the selectable user interface element 510. The user input that is used to obtain the tracing configuration may comprise the user selection of the selectable user interface element 510. The orchestration component 210 may obtain the tracing configuration by retrieving the tracing configuration from the template stored in the template store 250 based on the user selection of the selectable user interface element 510, such as by using the identification 520 of the template that corresponds to the selected user interface element 510 to find the corresponding template in the template store 250 and retrieve the corresponding tracing configuration.

In some example embodiments, the orchestration component 210 may be configured to instruct the debug component 220 to set a breakpoint in the source code at the line number using the tracing configuration. A breakpoint is an intentional stopping or pausing place in a program, put in place for debugging purposes. Breakpoints are most commonly used to interrupt a running program immediately before the execution of a programmer-specified instruction. Other kinds of conditions can also be used, such as the reading, writing, or modification of a specific location in an area of memory. This type of breakpoint may be referred to as a conditional breakpoint, a data breakpoint, or a watchpoint.

In some example embodiments, when the breakpoint is hit, the execution of the source code may continue without stopping or may automatically continue after a brief pause. For example, the breakpoint may comprise a non-breaking breakpoint or a logpoint.

The debug component 220 comprises a debug adapter. A debug adapter is a program that can communicate with a debugger interface using a debug adapter protocol. A debug adapter may act as a bridge to a separate debugger or can be a debugger in and of itself. A debugger is a software program used to test and find bugs (e.g., errors) in other programs. A debugger may be used to run a program under controlled conditions that permit the user to track its execution and monitor changes in computer resources that may indicate malfunctioning code or other technical problems.

In some example embodiments, the debug component 220 may be configured to trace the variable indicated in the tracing configuration during execution of the source code. The tracing may comprise determining a value of the variable using the breakpoint in the source code and creating a call stack based on the execution of the source code. The debug component 220 may communicate the value of the variable and the call stack to the orchestration component 210, which may store the value of the variable and the call stack in a log in the log store 240. The log store 240 may comprise a data store that is configured to store values of variables and call stacks.

The orchestration component 210 may be configured to retrieve the value of the variable and the call stack from the log, and then display the value of the variable and the call stack on the computing device 204 of the user 202. FIG. 6 illustrates an example user interface 600 in which a value 610 of a variable 310 and a call stack 620 are displayed. The call stack 620 may comprise a list of names of functions or methods of the software application 260 called at runtime. The user interface 600 may be displayed on the computing device 204 in response to a request by the user 202 via the computing device 204 to display the results of the tracing orchestrated by the orchestration component 210.

The dynamic tracing system 200 provides several technical features that overcome the technical challenges of tracing variables. For example, the dynamic tracing system 200 may provide users 202 with the ability to define templates capturing source code details and map the template to a user interface or API that the user 202 or another user 202 is consuming. The dynamic tracing system 200 may also enable a user 202 that is a customer to dynamically trace the code flow of the software application 260, while hiding the complexity of debugging the software application 260. Additionally, the dynamic tracing system 200 relieves users 202, such as software developers, from having to embed logging of code flow and diagnostics inside their code. Furthermore, the dynamic tracing system 200 provides a program that may debug the software application 260 in the background without requiring the users 202 to debug the software application, thereby hiding the complexity of debugging the software application 260.

Figure 7:
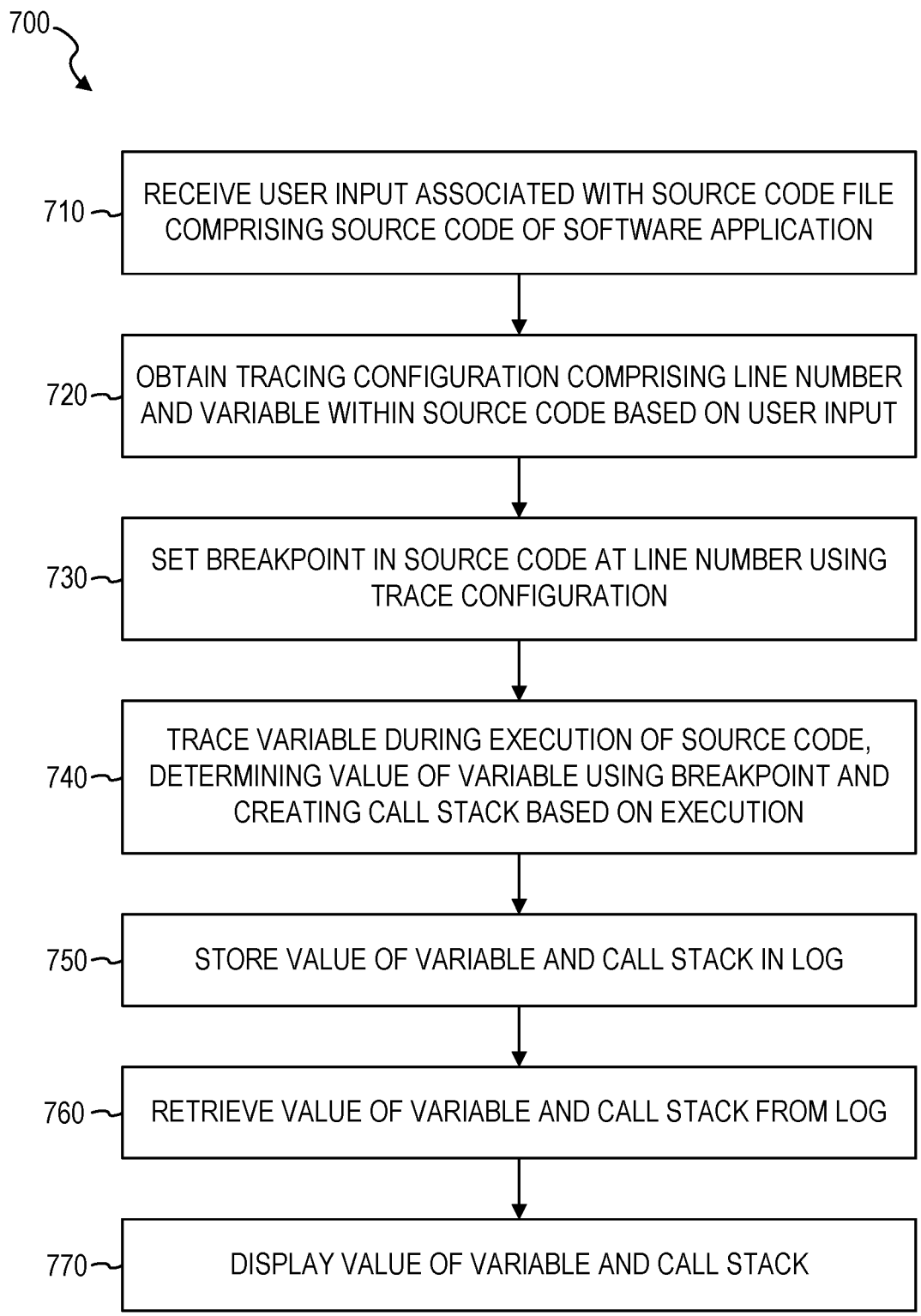
FIG. 7 is a flowchart illustrating an example method of dynamically tracing a variable.

FIG. 7 is a flowchart illustrating an example method 700 of dynamically tracing a variable. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the dynamic tracing system 200 of FIG. 2 or any combination of one or more of its components (e.g., the orchestration component 210, the debug component 220, the template component 230).

At operation 710, the dynamic tracing system 200 may receive a user input associated with a source code file via a first user interface displayed on a first computing device. The source code file may comprise source code of a software application. The software application may comprise a multi-tenant application. Other types of software applications are also within the scope of the present disclosure.

The dynamic tracing system 200 may then, at operation 720, obtain a tracing configuration based on the user input. The tracing configuration may comprise a line number of the source code and a variable within the source code. The user input received at operation 710 may comprise the tracing configuration, and the dynamic tracing system 200 may extract the tracing configuration directly from the received user input. The tracing configuration may be obtained in other ways as well. The variable may comprise a global variable or a stack variable. Other variables are also within the scope of the present disclosure.

Next, the dynamic tracing system 200 may set a breakpoint in the source code at the line number using the tracing configuration, at operation 730. For example, the dynamic tracing system 200 may insert the breakpoint at the line number indicated in the tracing configuration. The breakpoint may be configured to stop or pause the execution of the software application 260 at the line number.

At operation 740, the dynamic tracing system 200 may trace the variable during execution of the source code. The tracing may comprise determining a value of the variable using the breakpoint in the source code and creating a call stack based on the execution of the source code. For example, the dynamic tracing system 200 may evaluate an expression that includes the variable at the line number to compute the value of the variable. In some example embodiments, when the breakpoint is hit, the execution of the source code may continue without stopping or may automatically continue after a brief pause. For example, the breakpoint may comprise a non-breaking breakpoint or a logpoint.

The dynamic tracing system 200 may then, at operation 750, store the value of the variable and the call stack in a log. For example, the dynamic tracing system 200 may store the value of the variable and the call stack in a log file in the log store 240 for subsequent access and retrieval. However, other ways of storing the variable and the call stack are also within the scope of the present disclosure.

Next, the dynamic tracing system 200 may retrieve the value of the variable and the call stack from the log, at operation 760. In some example embodiments, the dynamic tracing system 200 may retrieve the value of the variable and the call stack in response to a request to access or view this information. This request may be submitted by the user 202 via the computing device 204 or by another system resource, such as another program.

At operation 770, the dynamic tracing system 200 may display the value of the variable and the call stack on the computing device 204. For example, the dynamic tracing system 200 may display the value of the variable and the call stack to a customer (e.g., targeted for users who have delivered the source code, such as a software provider or a partner that has provided an extension) on the computing device 204-1 or to a support engineer on the computing device 204-2. This displayed information may then be analyzed by the user 202 to resolve a technical problem with the software application 260.

It is contemplated that any of the other features described within the present disclosure can be incorporated into the method 700.

Figure 8:
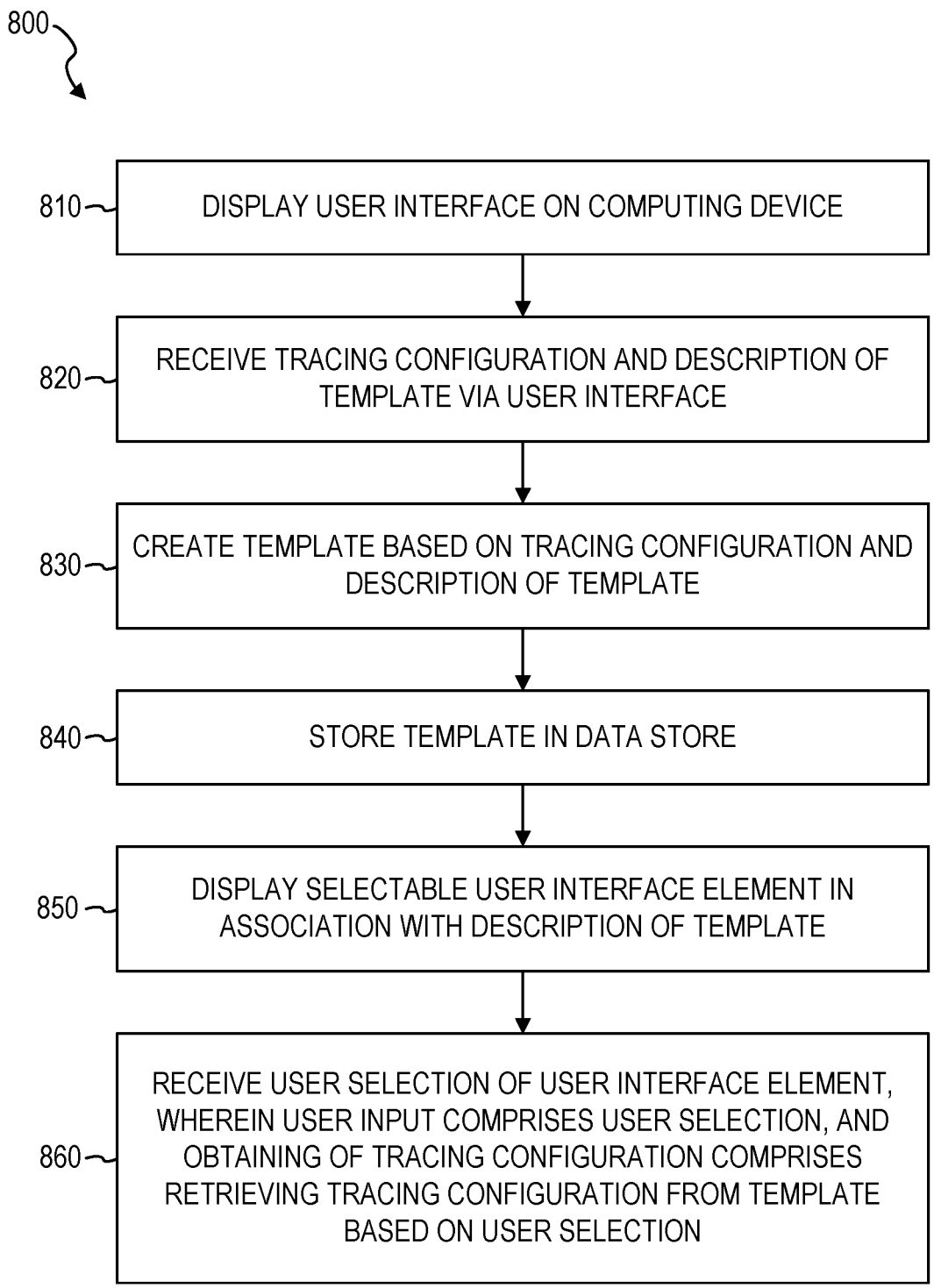
FIG. 8 is a flowchart illustrating an example method of enabling a user to create and use a template for dynamically tracing a variable.

FIG. 8 is a flowchart illustrating an example method 800 of enabling a user to create and use a template for dynamically tracing a variable. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the dynamic tracing system 200 of FIG. 2 or any combination of one or more of its components (e.g., the orchestration component 210, the debug component 220, the template component 230). In some example embodiments, the method 800 comprises operations 810, 820, 830, 840, 850, and 860, which may all be performed prior to operations of the method 700 in FIG. 7.

At operation 810, the dynamic tracing system 200 may display a user interface on the computing device 204. The user interface may be configured to enable the user 202 to submit details of a template, including the details of the tracing configuration. For example, the user interface may comprise one or more text fields or other user interface elements that the user 202 may use to enter, select, or otherwise provide the details of the template, such as an identification of the source code file, a line number indicating a location of where to inspect in the source code, a variable 310 to be included for inspection, and an identification of a user interface or an API to which to map the template. The user may also enter a description of the template. The description may indicate that use of the template comprises the tracing of the specified variable 310.

The dynamic tracing system 200 may then, at operation 820, receive the tracing configuration and the description of the template via the user interface. For example, the user 202 may receive the tracing configuration and the description of the template via one or more user interface elements displayed in the user interface.

Next, the dynamic tracing system 200 may create the template based on the tracing configuration and the description of the template received via the user interface, at operation 830. The template may comprise the line number and variable 310 of the tracing configuration.

At operation 840, the dynamic tracing system 200 may store the template in a data store. For example, the dynamic tracing system 200 may store the template in the template store 250. The template may comprise the tracing configuration and a description of the template. The description may indicate use of the template comprises the tracing of the variable.

The dynamic tracing system 200 may then, at operation 850, display a selectable user interface element in association with the description of the template on the first computing device within a user interface. For example, the dynamic tracing system 200 may display the selectable user interface element 510 in association with the description of the template 530, as discussed above with respect to the user interface 500 in FIG. 5.

Next, the dynamic tracing system 200 may receive a user selection of the selectable user interface element 510 via the user interface 500, at operation 860. The user input discussed above with respect to the method 700 of FIG. 7 may comprise the user selection of the selectable user interface element 510. The obtaining of the tracing configuration discussed above with respect to operation 720 of the method 700 of FIG. 7 may comprise retrieving the tracing configuration from the template in the data store based on the user selection of the selectable user interface element.

It is contemplated that any of the other features described within the present disclosure can be incorporated into the method 800.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: receiving a user input associated with a source code file via a first user interface displayed on a first computing device, the source code file comprising source code of a software application; obtaining a tracing configuration based on the user input, the tracing configuration comprising a line number of the source code and a variable within the source code; setting a breakpoint in the source code at the line number using the tracing configuration; tracing the variable during execution of the source code, the tracing comprising determining a value of the variable using the breakpoint in the source code and creating a call stack based on the execution of the source code; and storing the value of the variable and the call stack in a log.

Example 2 includes the computer-implemented method of example 1, further comprising: retrieving the value of the variable and the call stack from the log; and displaying the value of the variable and the call stack on the first computing device or on a second computing device different from the first computing device.

Example 3 includes the computer-implemented method of example 1 or example 2, wherein the user input comprises the tracing configuration.

Example 4 includes the computer-implemented method of any one of examples 1 to 3, further comprising: storing a template in a data store, the template comprising the tracing configuration and a description of the template, the description indicating use of the template comprises the tracing of the variable; displaying a selectable user interface element in association with the description of the template on the first computing device within the first user interface; and receiving a user selection of the selectable user interface element via the first user interface, wherein the user input comprises the user selection of the selectable user interface element, wherein the obtaining of the tracing configuration comprises retrieving the tracing configuration from the template in the data store based on the user selection of the selectable user interface element.

Example 5 includes the computer-implemented method of any one of examples 1 to 4, further comprising: displaying a second user interface on a second computing device; receiving the tracing configuration and the description of the template via the second user interface; and creating the template based on the tracing configuration and the description of the template received via the second user interface.

Example 6 includes the computer-implemented method of any one of examples 1 to 5, wherein the variable comprises a global variable.

Example 7 includes the computer-implemented method of any one of examples 1 to 6, wherein the variable comprises a stack variable.

Example 8 includes the computer-implemented method of any one of examples 1 to 7, wherein the software application is a multi-tenant application.

Example 9 includes a system comprising: at least one processor; and a non-transitory computer-readable medium storing executable instructions that, when executed, cause the at least one processor to perform the method of any one of examples 1 to 8.

Example 10 includes a non-transitory machine-readable storage medium, tangibly embodying a set of instructions that, when executed by at least one processor, causes the at least one processor to perform the method of any one of examples 1 to 8.

Example 11 includes a machine-readable medium carrying a set of instructions that, when executed by at least one processor, causes the at least one processor to carry out the method of any one of examples 1 to 8.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 9:
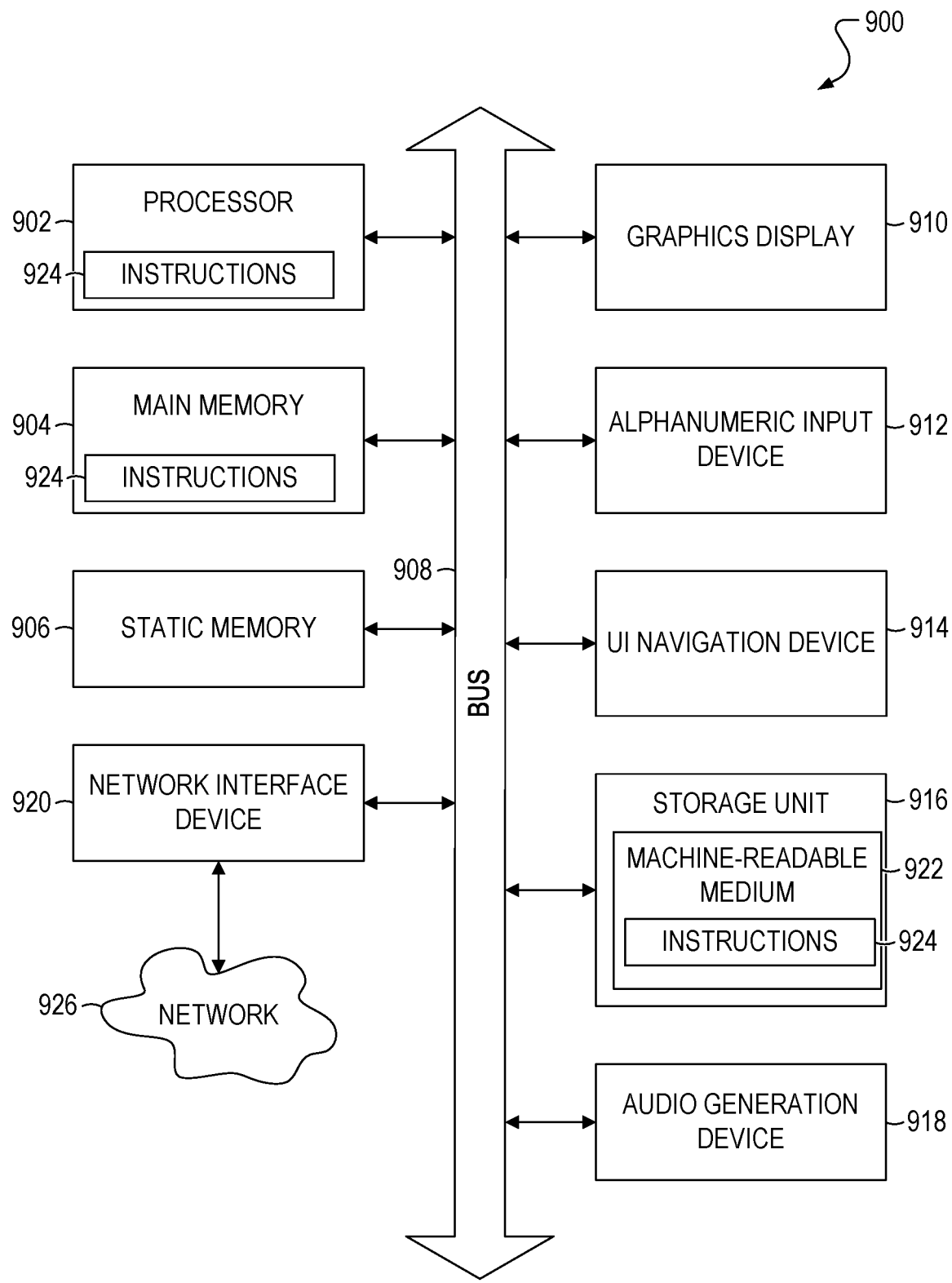
FIG. 9 is a block diagram of an example computer system on which methodologies described herein can be executed.

FIG. 9 is a block diagram of a machine in the example form of a computer system 900 within which instructions 924 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a graphics or video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a storage unit (e.g., a disk drive unit) 916, an audio or signal generation device 918 (e.g., a speaker), and a network interface device 920.

The storage unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. The instructions 924 may also reside, completely or at least partially, within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system comprising a memory and at least one hardware processor, the computer-implemented method comprising:
    storing a template in a data store, the template comprising a tracing configuration and a description of the template, the description indicating that use of the template comprises tracing of a variable;
    displaying, within a first user interface displayed on a first computing device, a selectable user interface element in association with the description of the template;
    receiving a user input associated with a source code file via the first user interface, the source code file comprising source code of a software application, the user input comprising a user selection of the selectable user interface element;
    retrieving the tracing configuration from the template in the data store based on the user selection of the selectable user interface element, the tracing configuration comprising a line number of the source code and the variable within the source code;
    setting a breakpoint in the source code at the line number using the tracing configuration;
    tracing the variable during execution of the source code, the tracing comprising determining a value of the variable using the breakpoint in the source code and creating a call stack based on the execution of the source code; and
    storing the value of the variable and the call stack in a log.

2. The computer-implemented method of claim 1, further comprising:
    retrieving the value of the variable and the call stack from the log; and
    displaying the value of the variable and the call stack on the first computing device or on a second computing device different from the first computing device.

3. The computer-implemented method of claim 1, wherein the user input comprises the tracing configuration.

4. The computer-implemented method of claim 1, further comprising:
    displaying a second user interface on a second computing device;
    receiving the tracing configuration and the description of the template via the second user interface; and
    creating the template based on the tracing configuration and the description of the template received via the second user interface.

5. The computer-implemented method of claim 1, wherein the variable comprises a global variable.

6. The computer-implemented method of claim 1, wherein the variable comprises a stack variable.

7. The computer-implemented method of claim 1, wherein the software application is a multi-tenant application.

8. A system of comprising:
    at least one hardware processor; and
    a non-transitory computer-readable medium storing executable instructions that, when executed, cause the at least one hardware processor to perform computer operations comprising:
        storing a template in a data store, the template comprising a tracing configuration and a description of the template, the description indicating that use of the template comprises tracing of a variable;
        displaying, within a first user interface displayed on a first computing device, a selectable user interface element in association with the description of the template;
        receiving a user input associated with a source code file via the first user interface, the source code file comprising source code of a software application, the user input comprising a user selection of the selectable user interface element;
        retrieving the tracing configuration from the template in the data store based on the user selection of the selectable user interface element, the tracing configuration comprising a line number of the source code and the variable within the source code;
        setting a breakpoint in the source code at the line number using the tracing configuration;
        tracing the variable during execution of the source code, the tracing comprising determining a value of the variable using the breakpoint in the source code and creating a call stack based on the execution of the source code; and
        storing the value of the variable and the call stack in a log.

9. The system of claim 8, wherein the computer operations further comprise:
    retrieving the value of the variable and the call stack from the log; and
    displaying the value of the variable and the call stack on the first computing device or on a second computing device different from the first computing device.

10. The system of claim 8, wherein the user input comprises the tracing configuration.

11. The system of claim 8, wherein the computer operations further comprise:
    displaying a second user interface on a second computing device;
    receiving the tracing configuration and the description of the template via the second user interface; and
    creating the template based on the tracing configuration and the description of the template received via the second user interface.

12. The system of claim 8, wherein the variable comprises a global variable.

13. The system of claim 8, wherein the variable comprises a stack variable.

14. The system of claim 8, wherein the software application is a multi-tenant application.

15. A non-transitory machine-readable storage medium tangibly embodying a set of instructions that, when executed by at least one hardware processor, causes the at least one processor to perform computer operations comprising:
    storing a template in a data store, the template comprising a tracing configuration and a description of the template, the description indicating that use of the template comprises tracing of a variable;

displaying, within a first user interface displayed on a first computing device, a selectable user interface element in association with the description of the template;

receiving a user input associated with a source code file via the first user interface, the source code file comprising source code of a software application, the user input comprising a user selection of the selectable user interface element;

retrieving the tracing configuration from the template in the data store based on the user selection of the selectable user interface element, the tracing configuration comprising a line number of the source code and the variable within the source code;

setting a breakpoint in the source code at the line number using the tracing configuration;

tracing the variable during execution of the source code, the tracing comprising determining a value of the variable using the breakpoint in the source code and creating a call stack based on the execution of the source code; and storing the value of the variable and the call stack in a log.

16. The non-transitory machine-readable storage medium of claim 15, wherein the computer operations further comprise:

retrieving the value of the variable and the call stack from the log; and displaying the value of the variable and the call stack on the first computing device or on a second computing device different from the first computing device.

17. The non-transitory machine-readable storage medium of claim 15, wherein the user input comprises the tracing configuration.

* * * * *